(12) United States Patent
Miyamae

(10) Patent No.: US 9,124,587 B2
(45) Date of Patent: Sep. 1, 2015

(54) INFORMATION PROCESSING SYSTEM AND CONTROL METHOD THEREOF

(71) Applicant: FUJITSU LIMITED, Kawasaki, Kanagawa (JP)

(72) Inventor: Takeshi Miyamae, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 335 days.

(21) Appl. No.: 13/912,158

(22) Filed: Jun. 6, 2013

(65) Prior Publication Data

US 2014/0012890 A1    Jan. 9, 2014

(30) Foreign Application Priority Data

Jul. 6, 2012 (JP) ................................ 2012-152261

(51) Int. Cl.
    *G06F 15/16*     (2006.01)
    *H04L 29/08*     (2006.01)

(52) U.S. Cl.
    CPC ............... *H04L 67/10* (2013.01); *H04L 67/06* (2013.01); *H04L 67/1097* (2013.01)

(58) Field of Classification Search
    CPC ...... H04L 67/10; H04L 67/1097; H04L 67/06
    See application file for complete search history.

(56) References Cited

U.S. PATENT DOCUMENTS

2007/0022469 A1*    1/2007    Cooper et al. .................... 726/3

OTHER PUBLICATIONS

Grossman, Robert et al., "An Overview of the Open Science Data Cloud", Proceedings of the 19th ACM International Symposium on High Performance Distributed Computing, pp. 377-384, ACM, Jun. 2010.
Gu, Yunhong, "Breaking the Data Transfer Bottleneck", UDT: A High Performance Data Transport Protocolm, http://udt.sourceforge.net/, Aug. 8, 2009.
Gu, Yunhong, Sector/Sphere Tutorial, http://sector.sourceforge.net/, Nov. 30, 2010.
Matsunaga, Andrea et al., "CloudBLAST: Combining MapReduce and Virtualization on Distributed Resources for Bioinformatics Applications", Fourth IEEE International Conference on eScience, pp. 222-229, IEEE, Dec. 2008.
Tsugawa, Mauricio et al., "A Virtual Network (ViNe) Architecture for Grid Computing", 20th IEEE International Parallel and Distributed Processing Symposium, IPDPS 2006, IEEE, Apr. 2006.

* cited by examiner

*Primary Examiner* — Krisna Lim
(74) *Attorney, Agent, or Firm* — Fujitsu Patent Center

(57) ABSTRACT

A disclosed information processing system includes plural information processing apparatuses connected with a network. One of the plural information processing apparatuses includes: a first allocation unit to identify, for each subnetwork of plural subnetworks included in the network, one information processing apparatus from among information processing apparatuses included in the subnetwork, and assign to the identified one information processing apparatus, a first Reduce processing that is a processing to summarize results of a Map processing executed for data held in the information processing apparatuses included in the subnetwork; and a second allocation unit to allocate to any one of the plural information processing apparatuses, a second Reduce processing that is a processing to summarize results of the first Reduce processing executed for each subnetwork of the plural subnetworks.

7 Claims, 18 Drawing Sheets

```
$> cwc.py bin/hadoop jar contrib/streaming/hadoop-streaming-0.20.203.0.jar\
        -input
gfsew://share1/user/hadoop/data1-1,gfsew://share1/user/hadoop/data1-2,gfsew://share2/u
ser/hadoop/data2-1,gfsew://share2/user/hadoop/data2-2\
        -output out28\
        -mapper /home/hadoop/hadoop-profile/hadoop-0.20.203.0/mapper.py\
        -reducer /home/hadoop/hadoop-profile/hadoop-0.20.203.0/reducer.py
```

FIG.4

```
$> bin/hadoop jar contrib/streaming/hadoop-streaming-0.20.203.0.jar\
        -input
gfsew://share1/user/hadoop/data1-1,gfsew://share1/user/hadoop/data1-2,gfsew://share2/u
ser/hadoop/data2-1,gfsew://share2/user/hadoop/data2-2\
        -output out28\
        -mapper /home/hadoop/hadoop-profile/hadoop-0.20.203.0/mapper.py\
        -reducer /home/hadoop/hadoop-profile/hadoop-0.20.203.0/reducer.py
```

FIG.5

INFORMATION PROCESSING SYSTEM AND CONTROL METHOD THEREOF

CROSS-REFERENCE TO RELATED APPLICATIONS

This application is based upon and claims the benefit of priority of the prior Japanese Patent Application No. 2012-152261, filed on Jul. 6, 2012, the entire contents of which are incorporated herein by reference.

FIELD

This invention relates to a control technique for an information processing system.

BACKGROUND

In order to improve throughput when executing a large-scale MapReduce job over a wide area, it is extremely important that no delays in communication occur. Conventionally, the following technique was developed in order to suppress a drop in throughput due to delays in communication.

For example, in an Open Science Data Cloud (OSDC), it becomes possible to execute Hadoop over a wide area by connecting data centers using dedicated lines.

Moreover, in a wide area network, a processing for Transmission Control Protocol (TCP) is sometimes the cause of delays. Therefore, the use of a protocol called UDP-based Data Transfer Protocol (UDT) that is based on User Datagram Protocol (UDP) is proposed. Furthermore, in a technique that is called Sector/Sphere, UDT is employed as the core technique in order to achieve a distributed file system and parallel data processing.

In the technique that is called CloudBLAST, the throughput is improved by using a Wide Area Network (WAN) technique in the transport layer, which is called ViNe (Virtual Network).

However, there are cases in which the utilization of the techniques such as described above is not always suitable for a MapReduce job. For example, not only is the cost of techniques such as described above high, but flexibly analyzing data that is generated daily at data centers located around the world is difficult. Furthermore, when the transport-layer protocol other than TCP is used, there is a possibility that the existing firewall framework may not be usable, so there is a security problem.

Moreover, there is no conventional art that can improve the throughput in the MapReduce processing that is executed over a wide area.

SUMMARY

An information processing system relating to this invention includes: plural information processing apparatuses connected with a network. One of the plural information processing apparatuses includes: a first allocation unit to identify, for each subnetwork of plural subnetworks included in the network, one information processing apparatus from among information processing apparatuses included in the subnetwork, and assign to the identified one information processing apparatus, a first Reduce processing that is a processing to summarize results of a Map processing executed for data held in the information processing apparatuses included in the subnetwork; and a second allocation unit to allocate to any one of the plural information processing apparatuses, a second Reduce processing that is a processing to summarize results of the first Reduce processing executed for each subnetwork of the plural subnetworks.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram depicting an example of a command inputted by a user in case of performing CWC;
FIG. 5 is a diagram depicting an example of a command inputted by a user in case where CWC is not performed.

DESCRIPTION OF EMBODIMENTS

Embodiment 1

Figure 1:
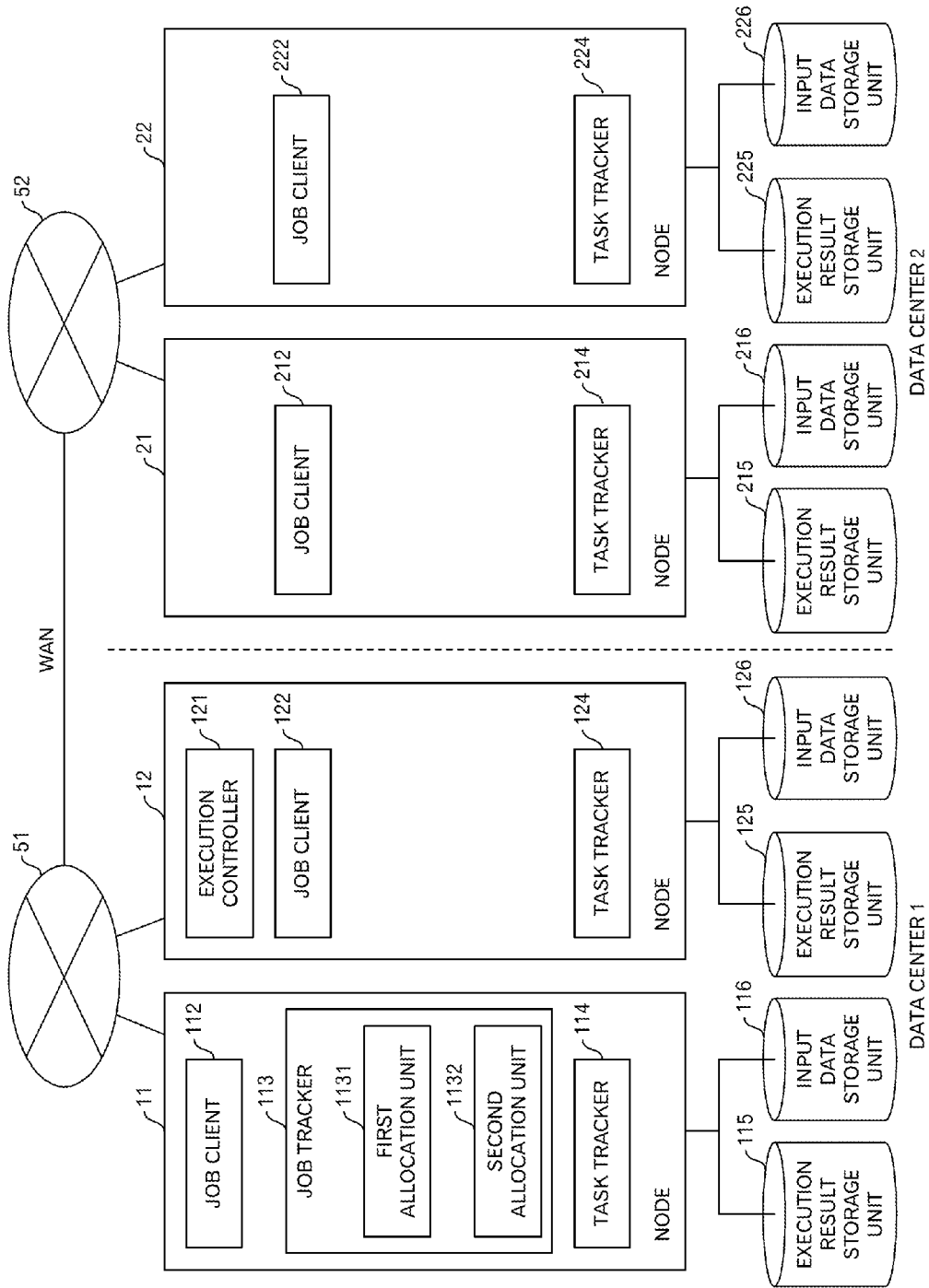
FIG. 1 is a diagram depicting an outline of a system.

FIG. 1 illustrates an outline of a system in a first embodiment. Networks 51 and 52 are Local Area Networks (LANs), for example, and are connected by way of a WAN (Wide Area Network) line. A node 11 and node 12 in a data center 1 are connected to the network 51, and a node 21 and node 22 in a data center 2 are connected to the network 52. In this embodiment, it is presumed that a MapReduce job is executed over a wide area, for example, the data center 1 is located in Tokyo and the data center 2 is located in New York.

The data that is the object of the MapReduce job is document data that is stored in an input data storage unit 116, an input data storage unit 126, an input data storage unit 216 and an input data storage unit 226. There is one or plural Map tasks and Reduce tasks included in one MapReduce job. In a Map task, the number of appearances of each word that is included in a document is counted, and in a Reduce task, the results of the Map tasks are summarized or aggregated.

The node 11 includes a job client 112, a job tracker 113 that includes a first allocation unit 1131 and a second allocation unit 1132, and a task tracker 114. An execution result storage unit 115 and an input data storage unit 116 are connected to the node 11.

The node 12 includes an execution controller 121, a job client 122 and a task tracker 124. An execution result storage unit 125 and an input data storage unit 126 are connected to the node 12.

The node 21 includes a job client 212 and a task tracker 214. An execution result storage unit 215 and an input data storage unit 216 are connected to the node 21.

The node 22 includes a job client 222 and a task tracker 224. An execution result storage unit 225 and an input data storage unit 226 are connected to the node 22.

When the execution controller 121 receives an execution instruction of a MapReduce job from a user, the execution controller 121 divides the MapReduce job relating to the execution instruction, and generates a MapReduce job for each data center (in other words, each network). The execution controller 121 outputs information on the MapReduce job after the division to the job client 122.

The job client 122 starts execution of the MapReduce job. More specifically, the job client 122 transmits the received information on the MapReduce job to the job tracker 113.

The job tracker 113 executes scheduling of the Map task and Reduce task. That is, when the job tracker 113 receives a task allocation request that requests allocation of a task from a task tracker, the job tracker 113 allocates a task that can be executed by the node that includes that task tracker. The task allocation request includes, for example, the number of empty slots among the slots for a Map task, and the number of empty slots among the slots for a Reduce task.

However, in this embodiment, a Reduce task is executed in each data center. Therefore, the first allocation unit 1131 in the job tracker 113 allocates a Reduce task that summarizes the results of the Map tasks that were executed in the data center 1 to a node in the data center 1. Similarly, the first allocation unit 1131 causes a node in the data center 2 to execute a Reduce task that summarizes the results of the Map tasks that were executed in the data center 2. The second allocation unit 1132 in the job tracker 113 then allocates a Reduce task that summarizes the results of the Reduce tasks that were executed in each data center to a node that is designated by the user.

Figure 2:
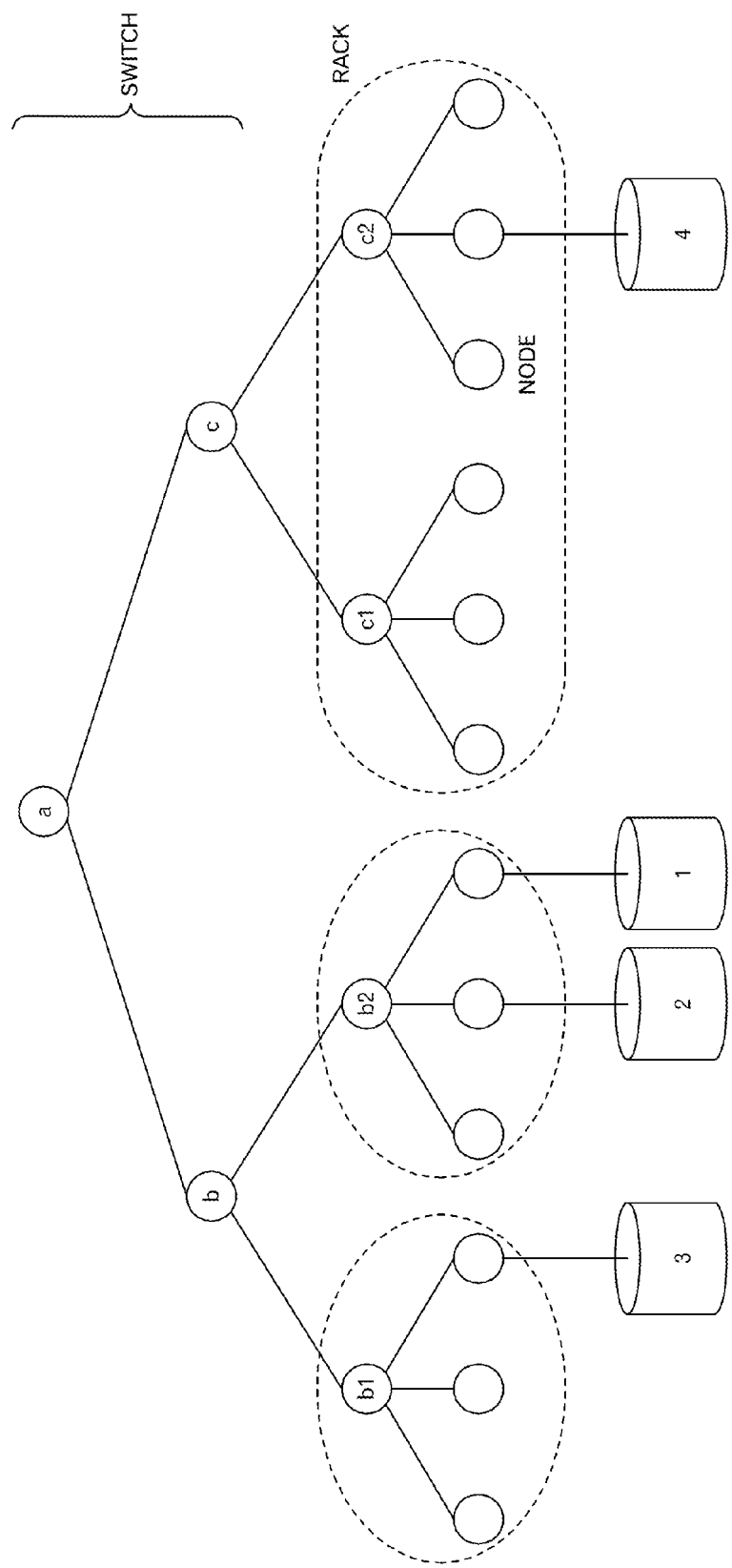
FIG. 2 is a diagram depicting a management structure.

The job tracker 113 saves a management structure such as illustrated in FIG. 2, and manages allocation by using such a management structure. For example, tasks for data 1, data 2 and data 3 are not allocated to the node that is subordinate to rack c2 in FIG. 2, however, a task for data 4 is allocated.

The task trackers 114 to 224 manage the number of Map tasks being executed and the number of Reduce tasks being executed. When there are an empty slot for a Map task and an empty slot for a Reduce task, the task trackers 114 to 224 transmit a task allocation request that requests allocation of the tasks for the empty slots to the job tracker 113. Then, when the task trackers 114 to 224 receive allocation data that includes information concerning the types of tasks and positions or locations of the input data from the job tracker 113, the task trackers 114 to 224 activate a process for executing the tasks. The execution results of the task are stored in the execution result storage units 115 to 225.

As for a further explanation of the job client, job tracker and task tracker, refer to the supplementary material that will be mentioned later.

Next, the operation of the system illustrated in FIG. 1 will be explained by using FIGS. 3 to 13. A method for executing a MapReduce job in this embodiment is called Cluster Wide Combiner (CWC).

Figure 3:
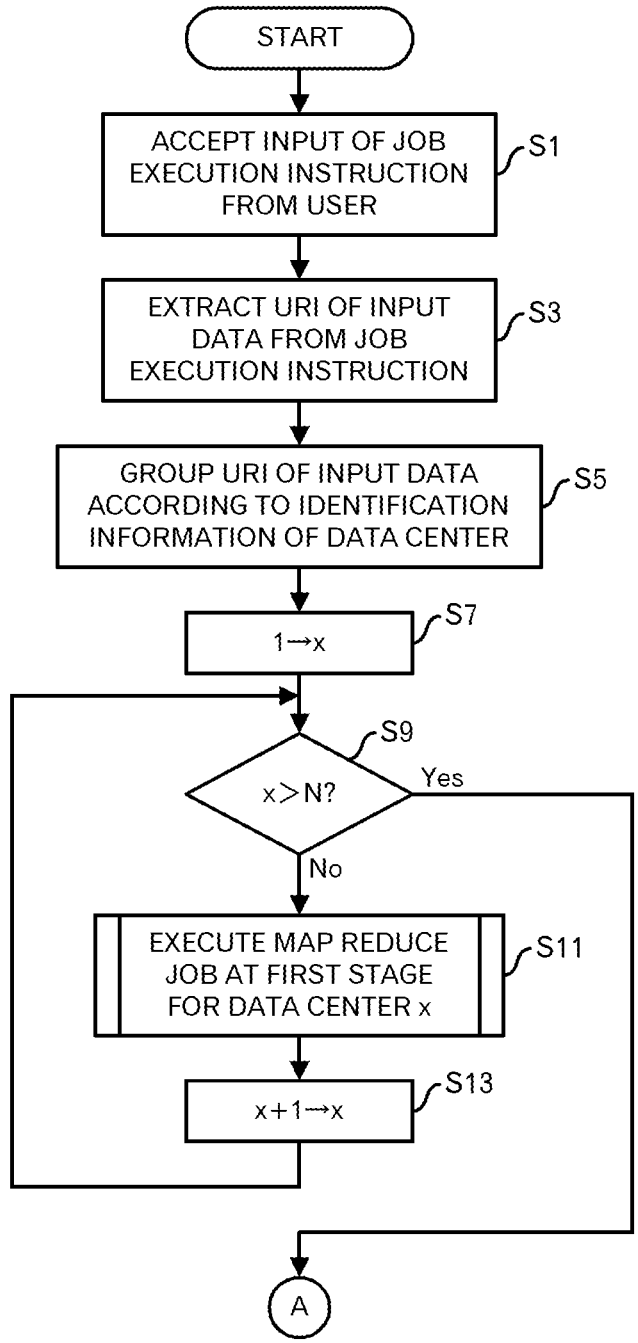
FIG. 3 is a diagram depicting a main processing flow in a first embodiment.

First, the user who operates the node 12 inputs a job execution instruction that includes output destination information for the execution results of the MapReduce job, and a Uniform Resource Identifier (URI) for the input data. The execution controller 121 of the node 12 accepts an input of the job execution instruction from the user (FIG. 3: step S1).

The user inputs a command such as illustrated in FIG. 4, for example, as a job execution instruction. The user designates CWC by adding data "cwc.py" to the start of the command. The input data is designated by what follows "-input", and the output destination is designated by what follows "-output". On the other hand, when a normal MapReduce job is designated instead of CWC, a command is inputted to which the data "cwc.py" is not added such as illustrated in FIG. 5.

Figure 6:
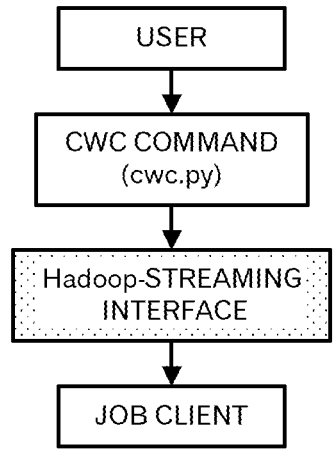
FIG. 6 is a diagram depicting an example of implementation by Hadoop streaming interface.

The command illustrated in FIG. 4 is an example of a command in the case of the implementation using Python. As illustrated in FIG. 6, when implementing using Python, the user creates a command having the same argument as the Hadoop streaming interface (here, this is cwc.py), and then executes "cwc.py". As for an explanation of the Hadoop streaming interface, refer to the supplementary material that will be mentioned later.

Figure 7:
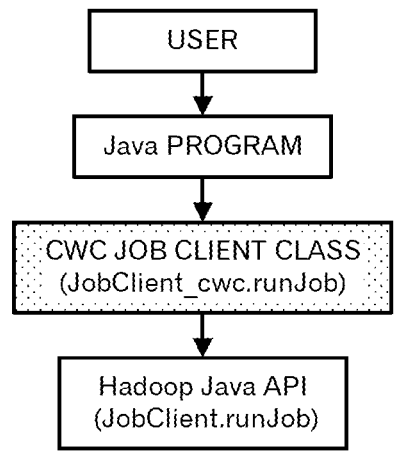
FIG. 7 is a diagram depicting an example of implementation by Java (registered trademark)

When the MapReduce job is described in Java (registered trademark), the argument is set by a Java Application Programming Interface (API), and after that, "JobClient.runjob" is called. Therefore, as illustrated in FIG. 7, when implementing using Java, for example, a child class (for example, JobClient_cwc) that inherits the job client is prepared, and that child class is called from the Java program of the MapReduce job. As a result, JobClient_cwc can intercept the argument.

Returning to the explanation of FIG. 3, the execution controller 121 extracts the URIs of the input data from the job execution instruction (step S3). Then, the execution controller 121 groups the URIs of the input data according to identification information of the data center, which is included in the URI (step S5). At the step S5, the grouping is performed so that the URIs of the input data that exist in the same data center are included in the same group. For example, when a user inputs an execution instruction such as in FIG. 4, the number immediately after "/data" in the URI is identification information of the data center.

The execution controller 121 sets "1" to a variable x, which is a variable for identifying the data center that is the object of processing (step S7).

The execution controller 121 determines whether x is greater than N (step S9). N is the number of data centers, and in this embodiment, N is 2. When x is greater than N (step S9: YES route), the execution controller 121 executes the MapReduce job at the second stage, so the processing moves to step S15 in FIG. 11 by way of terminal A. However, when x is N or less (step S9:NO route), the execution controller 121 executes the MapReduce job at the first stage for the data center x (step S11). The processing of the step S11 will be explained using FIG. 8 to FIG. 10.

Figure 8:
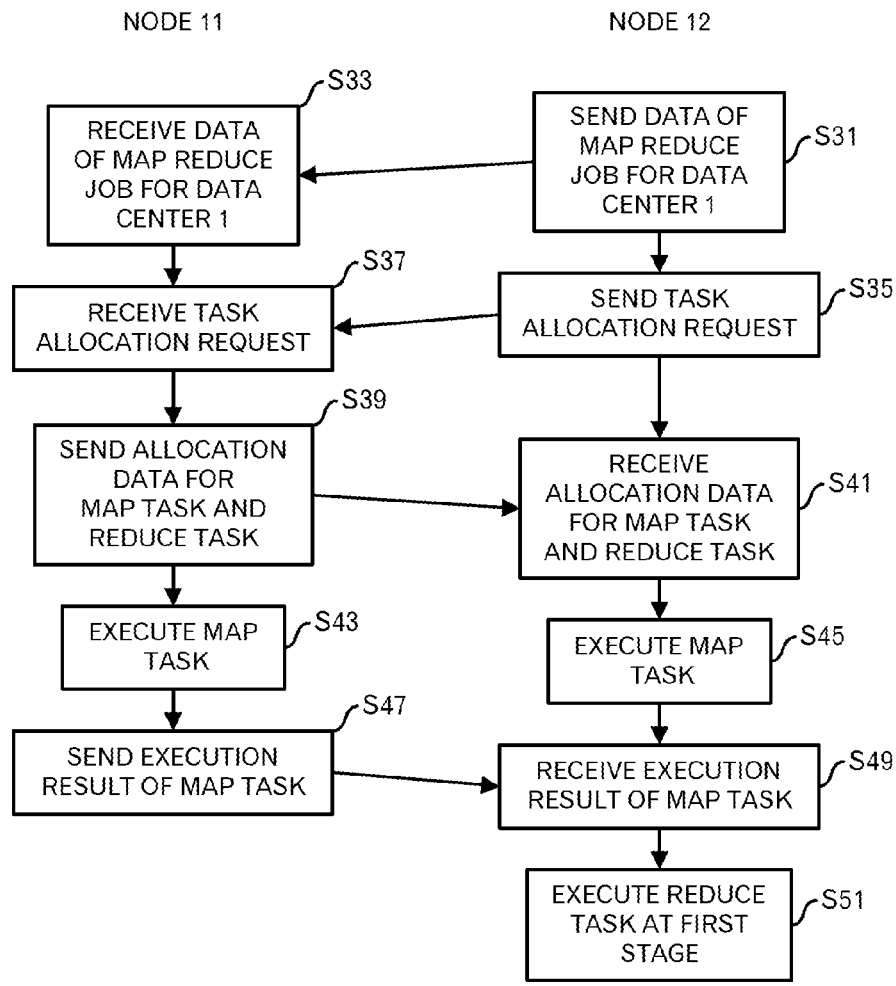
FIG. 8 is a diagram depicting a processing flow of a processing to execute a MapReduce job at a first stage in data center 1.

First, a processing in the case of executing a MapReduce job for the data center 1 will be explained using FIG. 8. The execution controller 121 outputs information on a MapReduce job for the data center 1 to the job client 122. The information on the MapReduce job includes the URI for the input data. The job client 122 transmits the information on the MapReduce job for the data center 1 to the job tracker 113 (FIG. 8: step S31).

The job tracker 113 in the node 11 receives the information on the MapReduce job for the data center 1 (step S33). Here, it is presumed that the URI of the input data represents the input data storage unit 116 in the node 11 and the input data storage unit 126 in the node 12. Therefore, the first allocation unit 1131 allocates tasks only when a task allocation request is received from the task tracker 114 and task tracker 124.

The task tracker 124 in the node 12 transmits a task allocation request to the job tracker 113 in the node 11 (step S35). The task allocation request includes, for example, identification information of the node, the number of empty slots among the slots for Map tasks, and the number of empty slots among the slots for Reduce tasks.

The job tracker 113 in the node 11 receives the task allocation request from the node 12 (step S37). The first allocation unit 1131 in the job tracker 113 then transmits allocation data for Map tasks and Reduce tasks to the task tracker 124 in the node 12 (step S39). The allocation data includes, for example, the type of tasks, and information concerning the location (or position) of the input data in the case of Map tasks, the offset and the size of the input data. It is not illustrated in the figure, however, it is presumed that the task tracker 114 in the node 11 also outputs a task allocation request to the job tracker 113, and receives allocation data for Map tasks from the job tracker 113.

The task tracker 124 in the node 12 receives allocation data for Map tasks and Reduce tasks from the node 11 (step S41). The task tracker 124 then activates a process for executing a Map task, and cause the process to execute the Map task (step S45).

On the other hand, the task tracker 114 in the node 11 activates a process for executing a Map task, and causes the process to execute the Map task (step S43). The task tracker 114 transmits the execution result of the Map task to the node 12 (step S47). Actually, when the node 12 that executes a Reduce task requests the node 11 to send the execution result of the Map task, the node 11 transmits the execution result of the Map task to the node 12.

The task tracker 124 in the node 12 receives the execution result of the Map task from the node 11 (step S49). The task tracker 124 activates a process for executing a Reduce task, and causes the process to execute the Reduce task at the first stage (step S51). In the Reduce task at the step S51, the execution result of the Map task in the node 11 and the execution result of the Map task in the node 12 are summarized, and the result of the Reduce task is stored in the execution result storage unit 125. After the Reduce task completes, the task tracker 124 outputs a completion notification to the execution controller 121.

Figure 9:
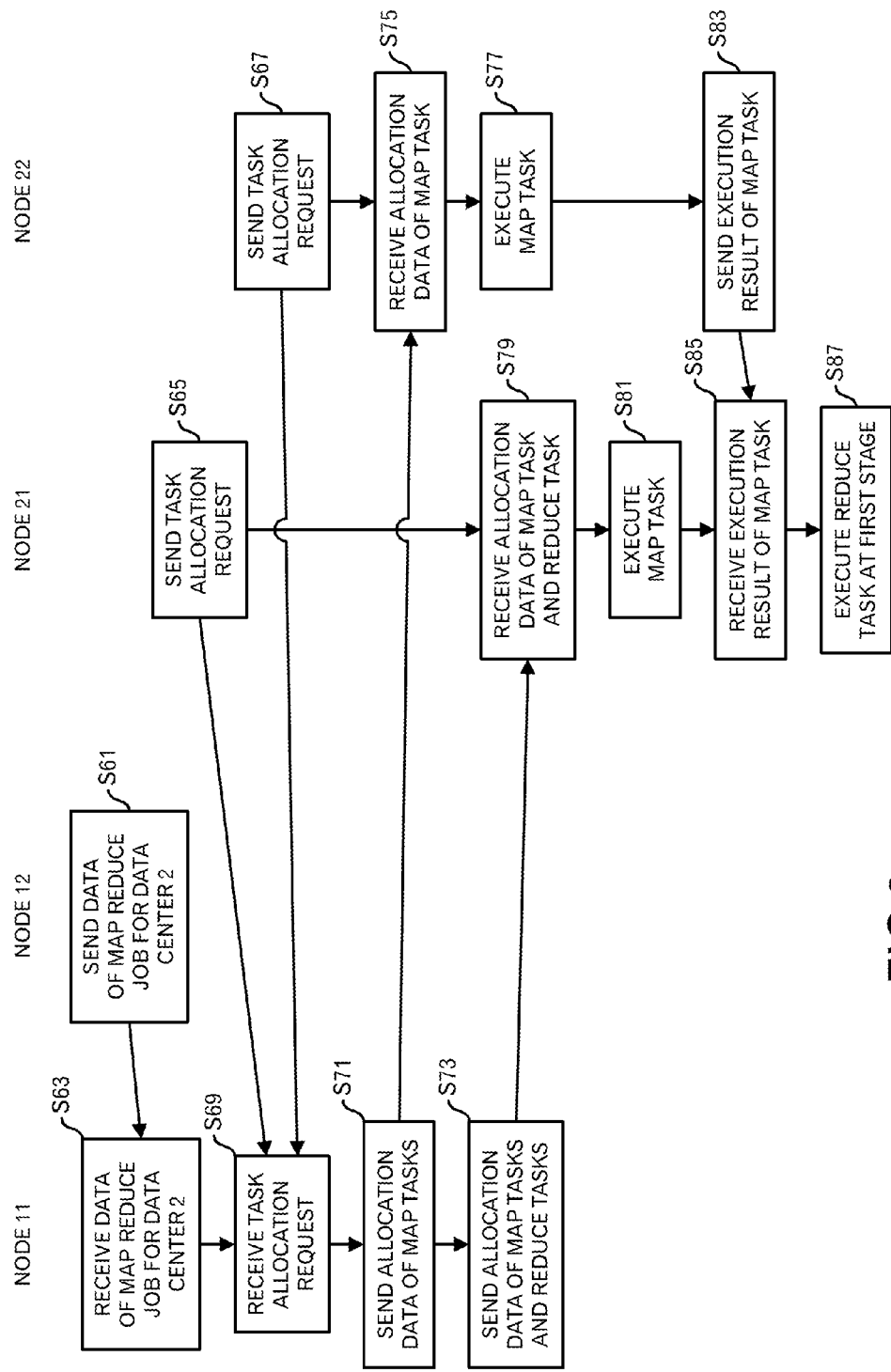
FIG. 9 is a diagram depicting a processing flow of a processing to execute a MapReduce job at a first stage in data center 2.

Next, the processing when executing a MapReduce job for the data center 2 will be explained using FIG. 9. The execution controller 121 outputs information on the MapReduce job for the data center 1 to the job client 122. The information on the MapReduce job includes the URI of the input data. The job client 122 then transmits the information on the MapReduce job for the data center 2 to the job tracker 113 (FIG. 9: step S61).

The job tracker 113 in the node 11 receives the information on the MapReduce job for the data center 2 (step S63). Here, it is presumed that the URI of the input data represents the input data storage unit 216 in the node 21 and the input data storage unit 226 in the node 22. Therefore, the first allocation unit 1131 allocates tasks only when a task allocation request is received from the task tracker 214 and the task tracker 224.

The task tracker 214 in the node 21 transmits a task allocation request to the job tracker 113 in the node 11 (step S65). The task tracker 224 in the node 22 transmits a task allocation request to the job tracker 113 in the node 11 (step S67).

The job tracker 113 in the node 11 receives a task allocation request from the node 21 and the node 22 (step S69). In order to simplify the explanation, the task allocation requests are received simultaneously from the node 21 and node 22, however, the timing of receipt of the task allocation requests is not always the same.

The first allocation unit 1131 transmits allocation data for a Map task to the task tracker 224 in the node 22 (step S71). The first allocation unit 1131 also transmits allocation data for a Map task and Reduce task to the task tracker 214 in the node 21 (step S73).

The task tracker 224 in the node 22 receives the allocation data for the Map task from the node 11 (step S75). The task tracker 224 then activates a process for executing the Map task, and causes the process to execute the Map task (step S77).

The task tracker 214 in the node 21 receives the allocation data for the Map task and Reduce task from the node 11 (step S79). The task tracker 214 then activates a process for executing the Map task, and cause the process to execute the Map task (step S81).

The task tracker 224 in the node 22 transmits the execution result of the Map task to the node 21 (step S83). Actually, when the node 21 that executes the Reduce task requests the node 22 to send back the execution result of the Map task, the node 22 transmits the execution result of the Map task to the node 21.

The task tracker 214 in the node 21 receives the execution result of the Map task from the node 22 (step S85). The task tracker 214 then activates a process for executing a Reduce task, and causes the process to execute the Reduce task at the first stage (step S87). In the Reduce task at the step S87, the execution result of the Map task in the node 21 and the execution result of the Map task in the node 22 are summarized, and the result of the Reduce job is stored in the execution result storage unit 215. After the Reduce task completes, the task tracker 214 transmits a completion notification to the execution controller 121 in the node 12.

Figure 10:
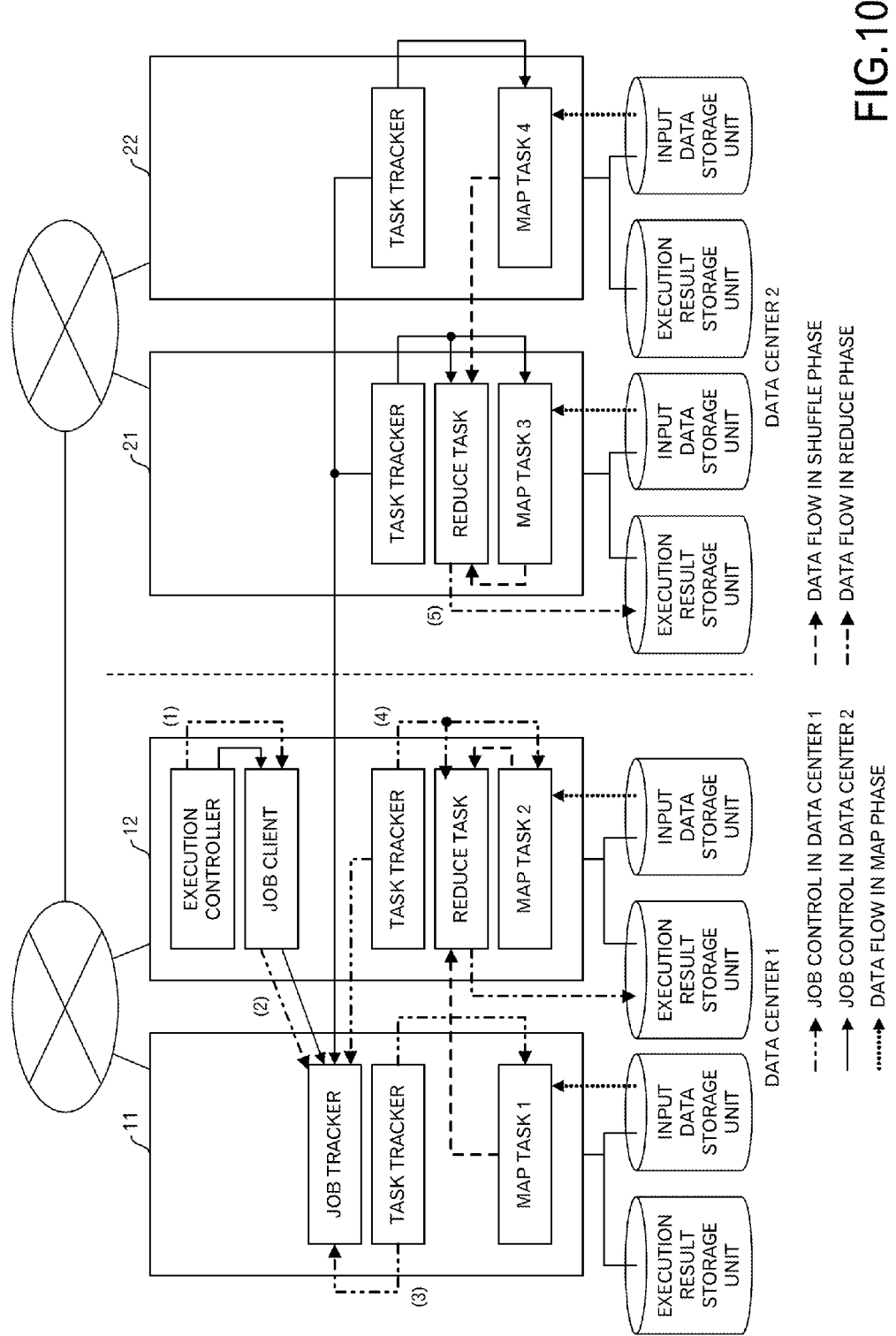
FIG. 10 is a diagram to explain the MapReduce job at the first stage.

FIG. 10 illustrates the contents that were explained using FIG. 8 and FIG. 9. The execution controller 121 outputs information on the MapReduce job for each data center to the job client 122 ((1) in FIG. 10). The job client 122 outputs the information on the MapReduce job for each data center to the job tracker 113 ((2) in FIG. 10).

When the job tracker 113 receives a task allocation request from a task tracker, the job tracker 113 transmits allocation data to that task tracker ((3) in FIG. 10). The task tracker activates a process, and cause the process to execute the Map task and Reduce task ((4) in FIG. 10). The execution result of the Reduce task is stored in the execution result storage unit.

For example, it is presumed that the Map task is a task that counts the number of times the word "example" appears, the result of Map task 1 represents (example, 1), or in other words, the word "example" has appeared one time. Moreover, it is presumed that the result of Map task 2 represents (example, 2), the result of Map task 3 represents (example, 2) and the result of Map task 4 represents (example, 3).

In this case, the result of the Reduce task in the node 12 becomes (example, 3), and the result of the Reduce task in the node 21 becomes (example, 5).

Returning to the explanation of FIG. 3, the execution controller 121 increments x by "1" (step S13), and the processing returns to the processing of the step S9.

Figure 11:
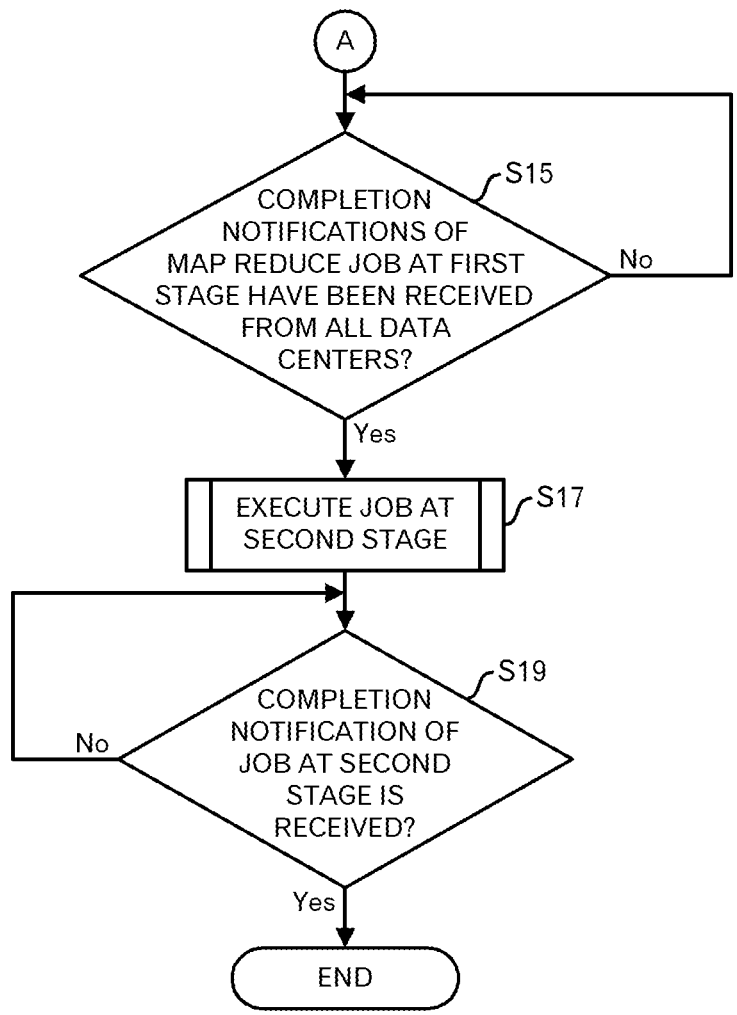
FIG. 11 is a diagram depicting a main processing flow in the first embodiment.

Moving to an explanation of FIG. 11, the execution controller 121 determines whether or not completion notifications for the MapReduce job at the first stage have been received from all of the data centers (step S15). When any completion notification has not been received from any data center (step S15: NO route), the execution controller 121 executes the processing of the step S15 again.

On the other hand, when the completion notifications for the MapReduce job at the first stage have been received from all of the data centers (step S15: YES route), the execution controller 121 executes a job at the second stage (step S17). The processing of the step S17 will be explained using FIG. 12 and FIG. 13.

Figure 12:
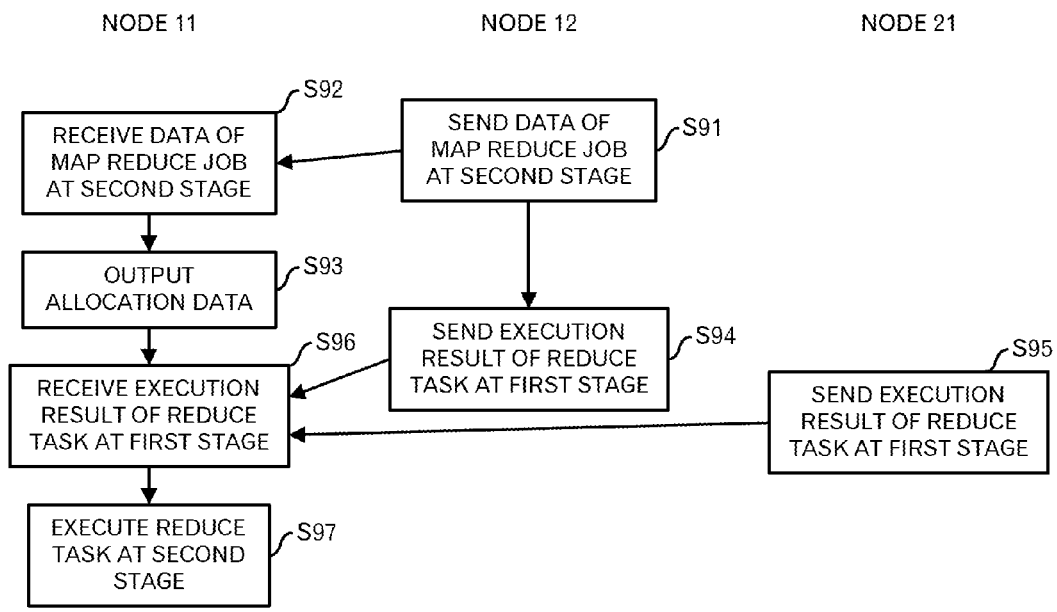
FIG. 12 is a diagram depicting a processing flow of a processing to execute a MapReduce job at a second stage.

First, the execution controller 121 outputs information concerning the MapReduce job at the second stage to the job client 122. The information concerning the MapReduce job at the second stage includes information regarding the output destination. The job client 122 transmits the information concerning the MapReduce job at the second stage to the job tracker 113 (FIG. 12: step S91).

The job tracker 113 in the node 11 receives the information concerning the MapReduce job at the second stage (step S92). Here, it is presumed that the information regarding the output destination represents the execution result storage unit 115 in the node 11. Therefore, the second allocation unit 1132 allocates a Reduce task only when a task allocation request for a Reduce task is received from the task tracker 114.

The task tracker 114 then outputs a task allocation request for a Reduce task to the job tracker 113. After that, the second allocation unit 1132 in the job tracker 113 outputs allocation data to the task tracker 114 (step S93). The received allocation data includes identification information of the nodes that holds the execution results of the Reduce tasks. Therefore, the task tracker 114 requests the node 12 and node 21, which are the nodes that holds the execution results of the Reduce tasks, to send the execution results of the Reduce tasks at the first stage.

In response to this, the task tracker 124 in the node 12 reads the execution result of the Reduce task at the first stage from the execution result storage unit 125, and transmits the result to the node 11 (step S94). Moreover, the task tracker 214 in the node 21 reads the execution result of the Reduce task at the first stage from the execution result storage unit 215, and transmits the result to the node 11 (step S95).

The task tracker 114 in the node 11 receives the execution results of the Reduce tasks at the first stage from the node 12 and node 21 (step S96). The task tracker 114 then activates a process for executing a Reduce task, and causes the process execute the Reduce task at the second stage (step S97). In the Reduce task at the step S97, the execution result of the Reduce task in the node 12 and the execution result of the Reduce task in the node 21 are summarized, and the execution results of the Reduce tasks are stored in the execution result storage unit 115. After the Reduce task completes, the task tracker 114 transmits a completion notification of the MapReduce job at the second stage to the execution controller 121 in the node 12.

Figure 13:
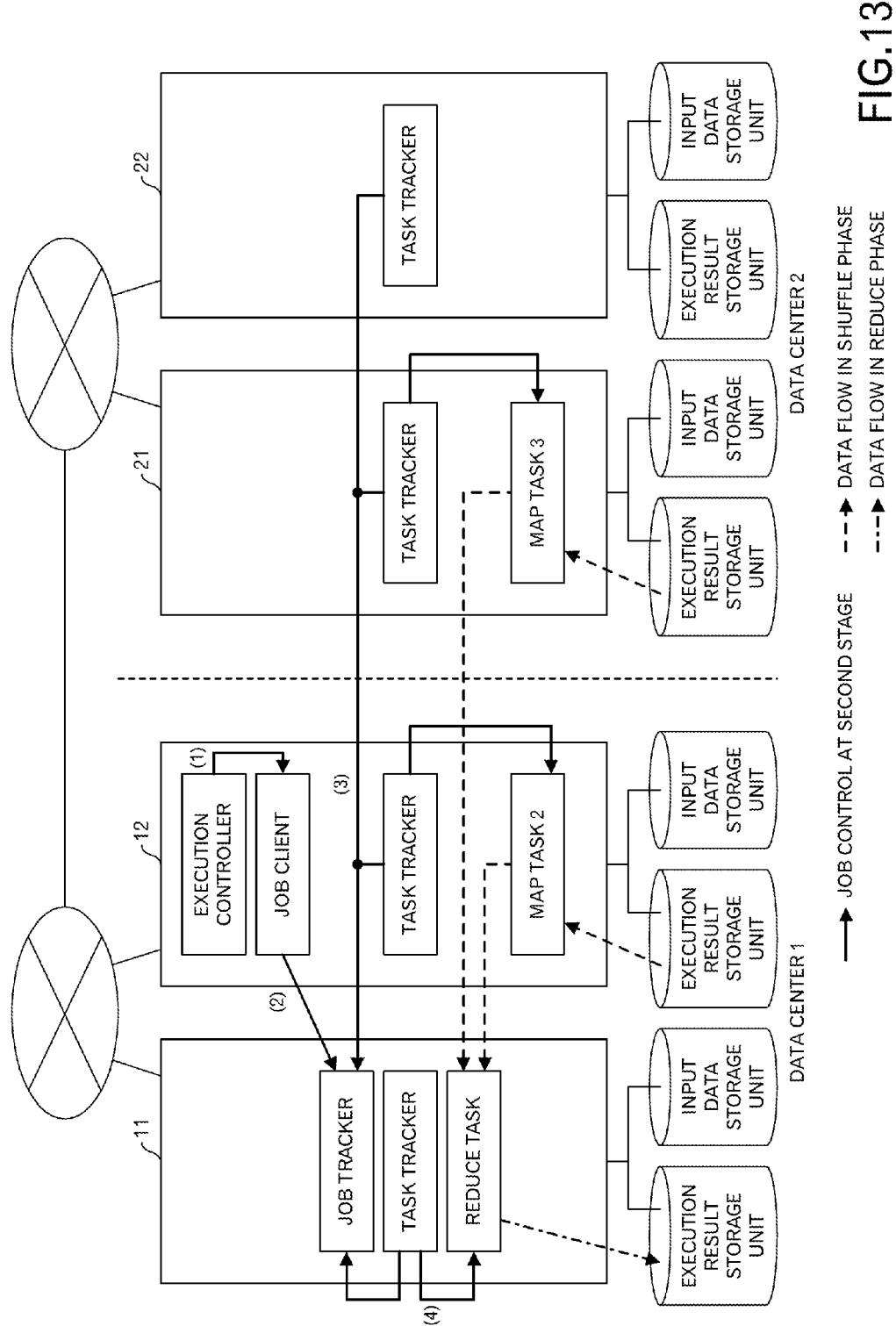
FIG. 13 is a diagram to explain the MapReduce job at the second stage.

FIG. 13 illustrates the processing contents that were explained using FIG. 12. The execution controller 121 outputs information concerning the MapReduce job at the second stage to the job client 122 ((1) in FIG. 13). The job client 122 then outputs information concerning the MapReduce job at the second stage to the job tracker 113 ((2) in FIG. 13).

When the second allocation unit 1132 in the job tracker 113 receives a task allocation request from a task tracker, the second allocation unit 1132 transmits allocation data to that task tracker ((3) in FIG. 13). Here, when a task allocation request for a Reduce task is received from the task tracker 114 in the node 11, the second allocation unit 1132 outputs allocation data for a Reduce task at the second stage to the task tracker 114. The task tracker 114 then requests the node 12 and node 22 to send execution results of the Reduce tasks at the first stage. The task tracker 124 in the node 12 reads the result of the Reduce task at the first stage from the execution result storage unit 125, and transmits the execution result to the node 11. Moreover, the task tracker 214 in the node 21 reads the result of the Reduce task at the first stage from the execution result storage unit 215, and transmits the execution result to the node 11. In FIG. 13, Map tasks are illustrated as being executed, however, actually, data is only read from the execution result storage units. The task tracker 114 then activates a process for the Reduce task at the second stage, and causes the process to execute the Reduce task ((4) in FIG. 13). The execution result of the Reduce task at the second stage is stored in the execution result storage unit 115.

For example, it is presumed that a Map task is a task that counts the number of times that the word "example" appears, the result of the Reduce task at the first stage, which is stored in the execution result storage unit 125, represents (example, 3), and the result of the Reduce task at the first stage, which is stored in the execution result storage unit 215, represents (example, 5). In this case, the result of the Reduce task at the second stage in the node 11 becomes (example, 8). In a shuffle phase at the second stage, the result of the Reduce task at the first stage is transmitted between data centers. However, the results of the Reduce tasks are summarized for each data center and then the result is transferred, so the amount of data that is transferred is less than in the normal wide-area Hadoop.

Returning to the explanation of FIG. 11, the execution controller 121 determines whether a completion notification of a MapReduce job at the second stage has been received (step S19). When the completion notification of the MapReduce job at the second stage has not been received (step S19: NO route), the execution controller 121 executes the step S19 again. On the other hand, when the completion notification of the MapReduce job at the second stage has been received (step S19: YES route), the processing ends.

Figure 19:
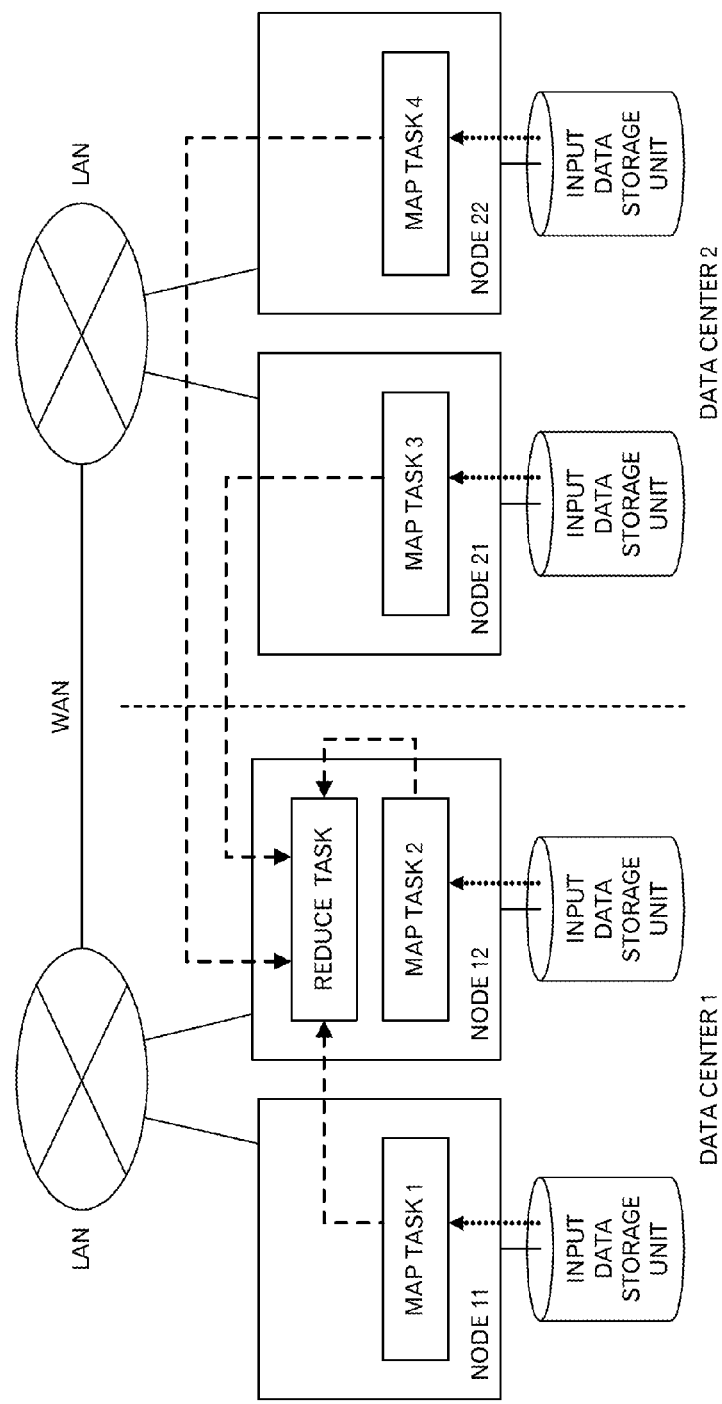
FIG. 19 is a diagram to explain an operation of the wide-area Hadoop.

As illustrated in FIG. 19, in the normal wide-area Hadoop, the Map task results are collected in one of the nodes. Therefore, the result of Map task 3 that was executed in the node 21 and the result of Map task 4 that was executed in the node 22 flow over the WAN. On the other hand, in the case of CWC, after the Map task results are summarized at each data center, the results are further summarized at one of the nodes. Consequently, in the example in FIG. 13, the result that flows over the WAN is only the result of the Reduce task that was executed in the node 21. Therefore, according to CWC, it is possible to reduce the amount of data that flows over the WAN, so it becomes more difficult for communication delays to occur in the WAN, and thus it is possible to improve the throughput.

Embodiment 2

The effect of CWC changes greatly depending on the number of unique words that are included in document data that is the object of processing. When the number of unique words is too little, the amount of data is greatly reduced by a combiner that is originally prepared for Hadoop, so the effect of CWC becomes difficult to notice. On the other hand, when the number of unique words is too great, the records having a common key among plural Map tasks that are executed at the first stage decrease, so even though CWC is executed, records are not summarized much in the data center. Conversely, due to the overhead for dividing a MapReduce job into two stages, the throughput of the MapReduce job may decrease. Therefore, in this embodiment, a following processing is executed.

Figure 14:
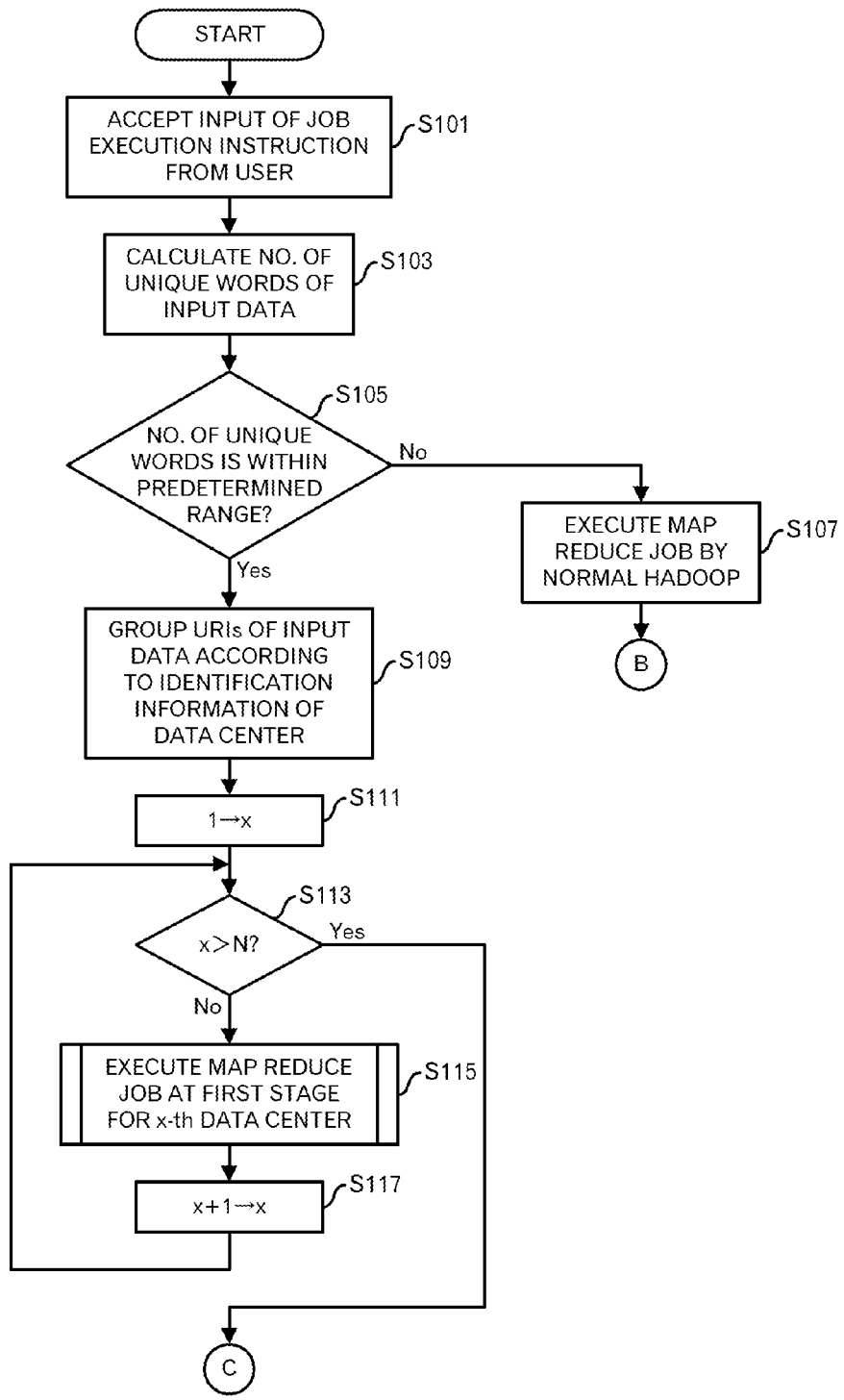
FIG. 14 is a diagram depicting a main processing flow in a second embodiment.

First, a user that operates the node 12 inputs a job execution instruction that includes information concerning the output destination of the execution results of the MapReduce job, and the URI of the input data. The execution controller 121 in the node 12 accepts the input of the job execution instruction from the user (FIG. 14: step S101).

The execution controller 121 calculates the number of unique words in the input data (step S103). At the step S103, the execution controller 121 collects at least part of the input data, and calculates the number of unique words.

The execution controller 121 determines whether the number of unique words is within a predetermined range (in other words, equal to or greater than a first preset threshold value, and less than or equal to a second preset threshold value) (step S105). When the number of unique words is not within the predetermined range (step S105: NO route), the execution controller 121 executes a MapReduce job by the normal Hadoop (step S107). The processing then ends by way of terminal B. When a MapReduce job is executed by the normal Hadoop, the execution controller 121 notifies the job client 122 of that.

On the other hand, when the number of unique words is within the predetermined range (step S105: YES route), the execution controller 121 extracts the URIs of the input data from the job execution instruction, and groups the extracted URIs according to the identification information of the data center, which is included in the URI (step S109). At the step S109, the grouping is performed so that URIs of input data that exists in the same data center are included in the same group.

The execution controller 121 sets "1" to a variable x, which is a variable for identifying the data center that is the object of processing (step S111).

The execution controller 121 determines whether x is greater than N (step S113). N is the number of data centers, and "2" in this embodiment. When x is greater than N (step S113: YES route), the processing moves to step S119 in FIG. 15 through the terminal A, so that the execution controller 121 executes a MapReduce job at the second stage. On the other hand, when x is equal to or less than N (step S113: NO route), the execution controller 121 executes a MapReduce job at the first stage for data center x (step S115). The processing of the step S115 is as explained using FIG. 8 to FIG. 10.

The execution controller 121 increments x by "1" (step S117), and the processing returns to the processing of the step S113.

Figure 15:
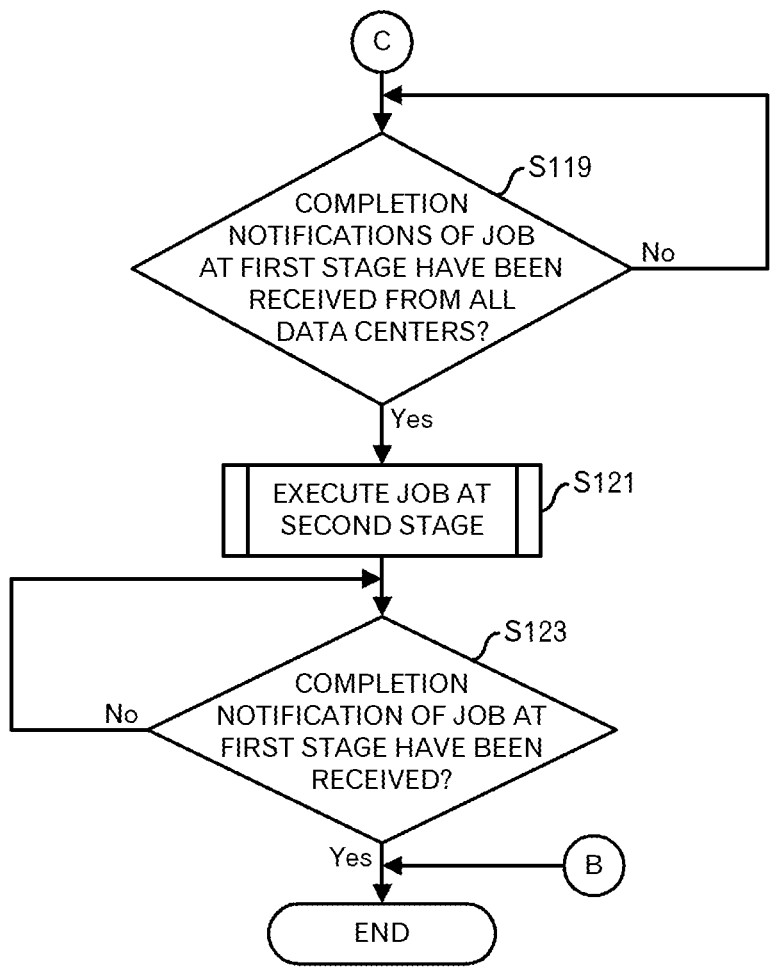
FIG. 15 is a diagram depicting a main processing flow in the second embodiment.

Moving to an explanation of FIG. 15, the execution controller 121 determines whether or not completion notifications for the MapReduce job at the first stage have been received from all of the data centers (step S119). When a completion notification has not been received from either data center (step S119: NO route), the execution controller 121 executes the processing of the step S119 again.

On the other hand, when the completion notifications for the MapReduce job at the first stage have been received from all data centers (step S119: YES route), the execution controller 121 executes the MapReduce job at the second stage (step S121). The processing of the step S121 is as explained using FIG. 12 and FIG. 13.

The execution controller 121 determines whether a completion notification for the MapReduce job at the second stage has been received (step S123). When the completion notification for the MapReduce job at the second stage has not been received (step S123: NO route) the execution controller 121 executes the processing of the step S123 again. However, when the completion notification for the MapReduce job at the second stage has been received (step S123: YES route), the processing ends.

When the aforementioned processing is carried out, CWC is executed as long as CWC is effective. Therefore, it is possible to avoid a state where the throughput is decreased by CWC.

Although the embodiments of this invention were explained above, this invention is not limited to those. For example, the aforementioned functional block diagram of the nodes 11 to 22 does not always correspond to a program module configuration.

Moreover, the aforementioned table structures are mere examples, and may be changed. Furthermore, as for the processing flow, as long as the processing results do not change, an order of steps may be changed. Furthermore, plural steps may be executed in parallel.

Figure 20:
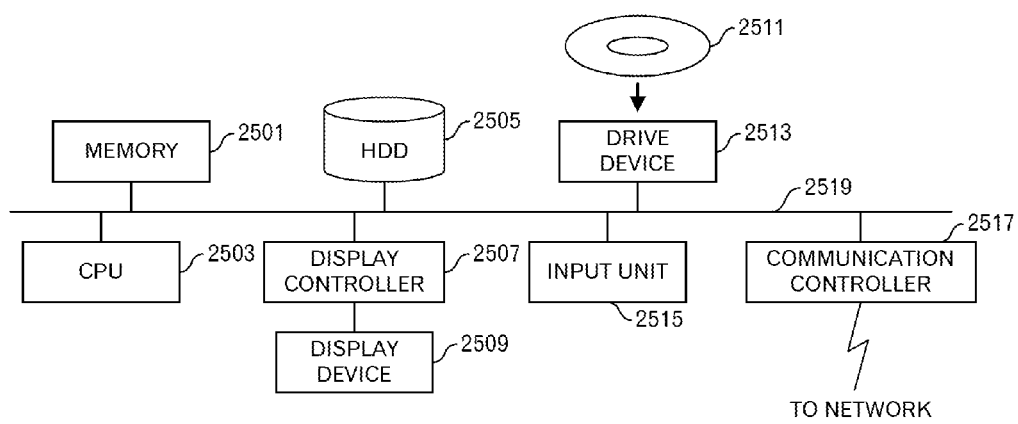
FIG. 20 is a functional block diagram of a computer.

In addition, the aforementioned nodes 11 to 22 are computer devices as illustrated in FIG. 20. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as illustrated in FIG. 20. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

[Appendix]

In this appendix, a technique associated with the embodiments will be explained.

1. Hadoop

Hadoop is a framework in which cluster nodes read a huge amount of data in parallel, and execute a batch processing (also called Hadoop job or job simply) at high speed.

Figure 16:
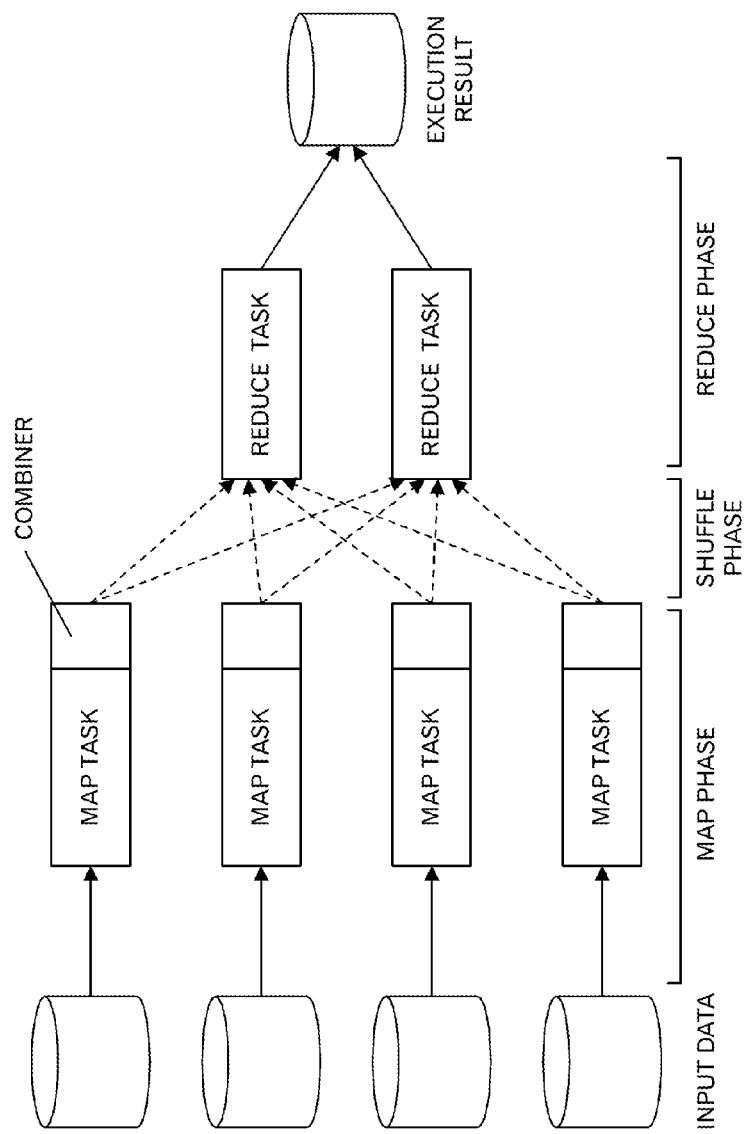
FIG. 16 is a diagram depicting an outline of Hadoop.

FIG. 16 illustrates an outline of the Hadoop job. Hadoop job includes a Map task, Reduce task and combiner.

The Map task is a processing to read input data and generate a record in a key-value-pair format. The transmission destination of the generated record is determined according to a hash function or the like, for example. Typically, plural Map tasks can be executed in parallel.

The Reduce task is a processing to summarize the records and output results of the batch processing. Typically, plural Reduce tasks can be executed in parallel.

The combiner is a processing executed as a post-processing of the Map task. The combiner reduces an amount of transferred data by summarizing plural records when plural records including the same key among results of the Map tasks exist.

A phase in which the Map task is executed is called Map phase, a phase in which the Reduce task is executed is called Reduce phase, and a phase in which the result of the Map task is transferred to the Reduce task is called shuffle phase.

The contents of the Map task and Reduce task can be described in a format of a function by the user. The functions are called Map function and Reduce function.

Figure 17:
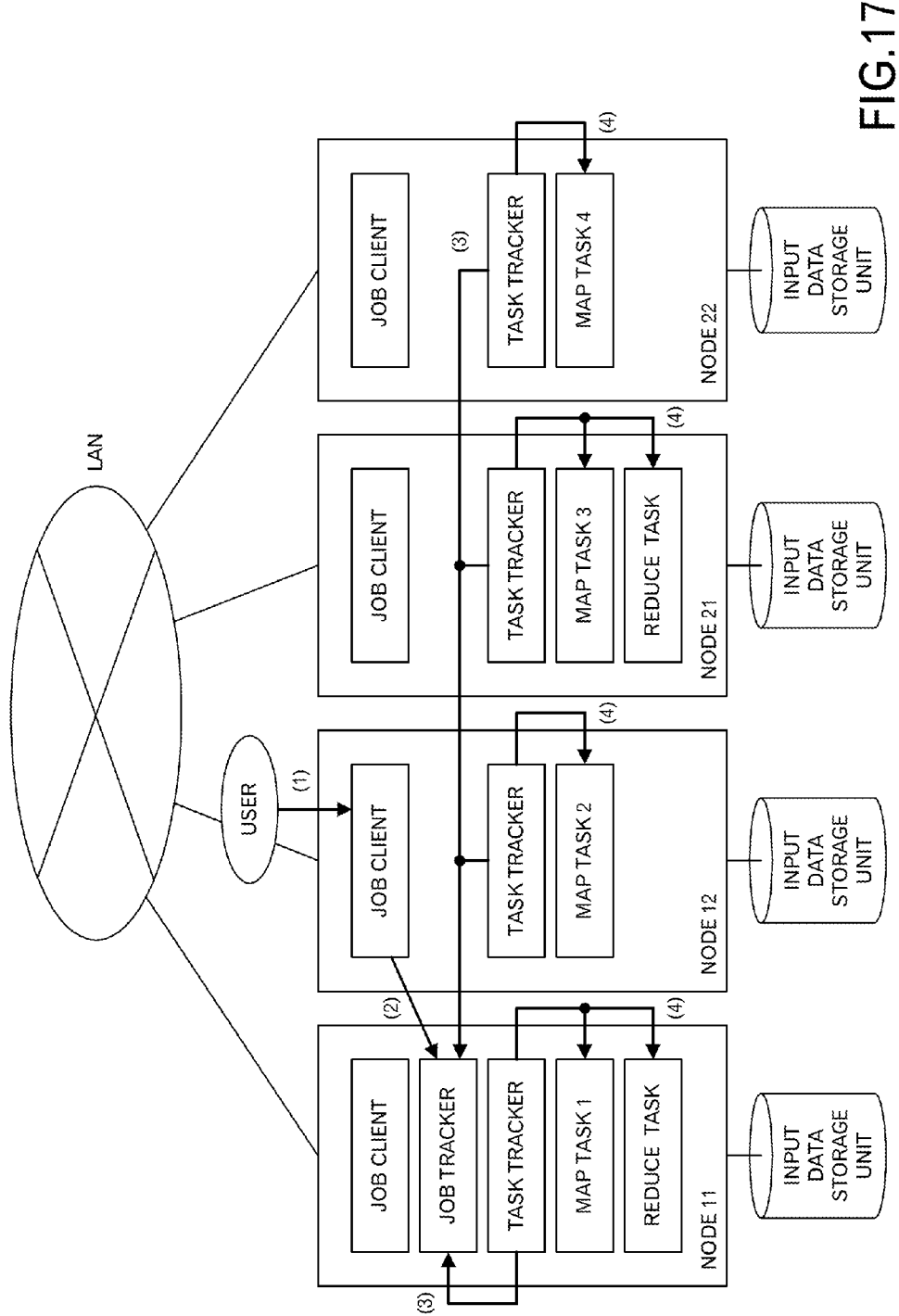
FIG. 17 is a diagram depicting components of Hadoop.

Components of Hadoop will be explained by using FIG. 17. Hadoop includes a job client, job tracker and task tracker.

The job client operates on each node in a cluster. The job client has a role to start a Hadoop job designated by a user. The job client transmits information on the Hadoop job designated by the user to the job tracker. Such processing relates to (1) and (2) in FIG. 17.

The job tracker starts the Hadoop job, and manages a progress status of the Hadoop job. Moreover, in response to a request from the task tracker, the job tracker allocates a Map task and Reduce task (i.e. performs scheduling.) This processing relates to (3) in FIG. 17.

The task tracker manages the number of Map tasks to be executed and the number of Reduce tasks to be executed. When a slot for the Map task or a slot for the Reduce task becomes empty, the task tracker requests the job tracker to allocate the task for the empty slots. When the task is allocated by the job tracker, the task tracker activates a process to execute a task. Such processing relates to (4) in FIG. 17.

2. Wide-area Hadoop

Figure 18:
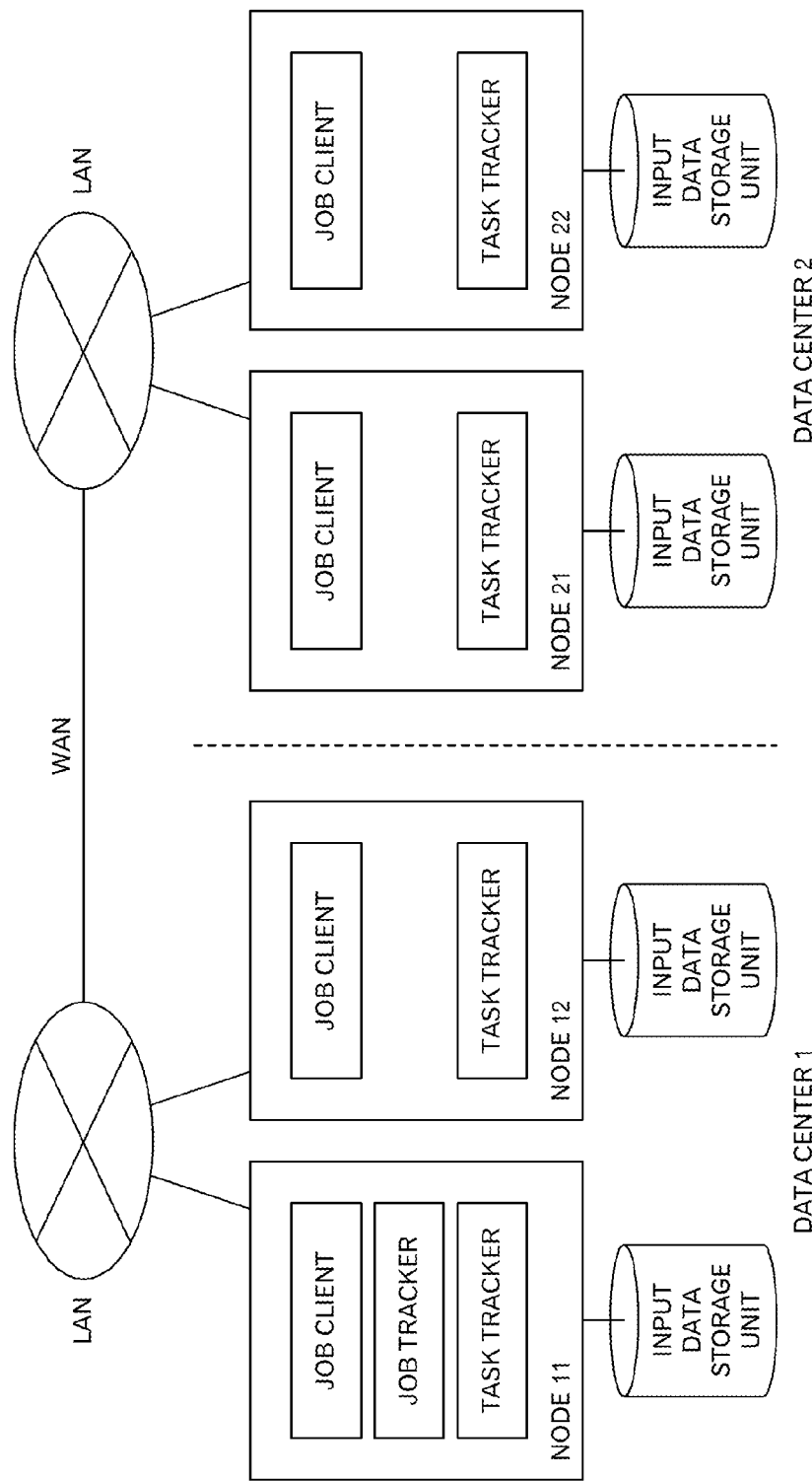
FIG. 18 is a diagram depicting components of wide-area Hadoop.

When the Hadoop job is executed over plural data centers connected through WAN, a cluster is constructed over the plural data centers as illustrated in FIG. 18, for example. When constructing the wide-area cluster, the logical configuration does not change from the configuration explained above. Normally, the job tracker is provided in either data center. Because the job client operates on each node in the cluster, it is possible for the user to instruct the execution of the Hadoop job on an arbitrary node.

Moreover, as illustrated in FIG. 19, any one node (in an example of FIG. 19, node 12) collects results of the Map task, and summarizes the results of the Map task in the Reduce task.

3. Hadoop Streaming Interface

The Hadoop streaming interface is a mechanism for enabling to describe a Map function and Reduce function in programming languages other than Java by enabling to utilize a standard input and output as the input and output of the Map function and Reduce function. When activating the Hadoop job, the Map function, Reduce function, input file, output file and the like are designated by arguments of the command.

Typically, the interface to start the Hadoop job is an API in Java. Therefore, in order to execute the Hadoop job, an appropriate Java class is implemented. Moreover, each of the Map function and Reduce function is implemented as a Java class.

The aforementioned embodiments are outlined as follows:

An information processing system relating to a first mode of the embodiments includes: plural information processing apparatuses connected with a network. One of the plural information processing apparatuses includes: (A) a first allocation unit to identify, for each subnetwork of plural subnetworks included in the network, one information processing apparatus from among information processing apparatuses included in the subnetwork, and assign to the identified one information processing apparatus, a first Reduce processing that is a processing to summarize results of a Map processing executed for data held in the information processing apparatuses included in the subnetwork; and (B) a second allocation unit to allocate to any one of the plural information processing apparatuses, a second Reduce processing that is a processing to summarize results of the first Reduce processing executed for each subnetwork of the plural subnetworks.

When executing a MapReduce processing over a wide area, it is important to avoid the communication delay in the network connecting the subnetworks in order to improve the throughput. Then, according to the aforementioned configuration, it is possible to reduce an amount of data that flows on the network connecting the subnetworks. Therefore, it becomes possible to improve the throughput of the MapReduce processing executed in the wide area.

Moreover, the information processing apparatus, to which the first Reduce processing is allocated, (C) may collect the results of the Map processing from the information processing apparatuses belonging to a same subnetwork, and summarize the collected results of the Map processing. Moreover, the information processing apparatus, to which the second Reduce processing is allocated, (D) may collect the results of the first Reduce processing from information processing apparatuses that executed the first Reduce processing, and summarize the collected results of the first Reduce processing.

Thus, the amount of data that flows on the network connecting the subnetworks can be reduced compared with a case where the Reduce processing is simply executed once.

Moreover, the aforementioned Map processing may be a processing to count an appearance frequency of a word in a document. In such a case, the one of the plural information processing apparatuses may further include: (E) an execution controller to execute a processing to count a number of unique words for data held in the plurality of information processing apparatuses, and causes the first allocation unit and the second allocation unit to execute a processing in case where the counted number of unique words is within a predetermined value.

In case where the number of unique words is extremely little or great, the throughput may not be improved so much, even when the aforementioned first and second Reduce processing. Then, by employing the aforementioned configuration, it becomes possible to execute a processing only when the improvement of the throughput is expected.

Moreover, the plural subnetworks may be local area networks, and the network including the plural subnetworks may be a wide area network.

According to this feature, it becomes possible to treat a case where the MapReduce processing is executed in WAN such as the Internet, for example.

Moreover, the aforementioned second allocation unit (b1) may allocate the second Reduce processing to an information processing apparatus designated by a user among the plurality of information processing apparatuses.

Thus, it is possible for the user to designate the information processing apparatus of the output destination of the MapReduce processing.

A control method relating to a second mode of the embodiments includes: (F) identifying, by using one of plural information processing apparatuses connected with a network, for each subnetwork of plural subnetworks included in the network, one information processing apparatus from among information processing apparatuses included in the subnetwork; assigning, by using the one of the plural information processing apparatuses, for each subnetwork of the plural subnetworks, to the identified one information processing apparatus, a first Reduce processing that is a processing to summarize results of a Map processing executed for data held in the information processing apparatuses included in the subnetwork; (G) and allocating, by using the one of the plural information processing apparatuses, for each subnetwork of the plural subnetworks, to any one of the plural information processing apparatuses, a second Reduce processing that is a processing to summarize results of the first Reduce processing executed for each subnetwork of the plural subnetworks.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing system, comprising:
  a plurality of information processing apparatuses connected with a network,
  wherein one of the plurality of information processing apparatuses comprises:
  a first allocation unit to identify, for each subnetwork of a plurality of subnetworks included in the network, one information processing apparatus from among information processing apparatuses included in the subnetwork, and assign to the identified one information processing apparatus, a first Reduce processing that is a processing to summarize results of a Map processing executed for data held in the information processing apparatuses included in the subnetwork; and
  a second allocation unit to allocate to any one of the plurality of information processing apparatuses, a second Reduce processing that is a processing to summarize results of the first Reduce processing executed for each subnetwork of the plurality of subnetworks.

2. The information processing system as set forth in claim 1, wherein the information processing apparatus, to which the first Reduce processing is allocated, collects the results of the Map processing from the information processing apparatuses belonging to a same subnetwork, and summarizes the collected results of the Map processing, and
  the information processing apparatus, to which the second Reduce processing is allocated, collects the results of the first Reduce processing from information processing apparatuses that executed the first Reduce processing, and summarizes the collected results of the first Reduce processing.

3. The information processing system as set forth in claim 1, wherein the Map processing is a processing to count an appearance frequency of a word in a document, and the one of the plurality of information processing apparatuses further comprises:
  an execution controller to execute a processing to count a number of unique words for data held in the plurality of information processing apparatuses, and causes the first allocation unit and the second allocation unit to execute a processing in case where the counted number of unique words is within a predetermined value.

4. The information processing system as set forth in claim 1, wherein the plurality of subnetworks are local area networks, and the network including the plurality of subnetworks is a wide area network.

5. The information processing system as set forth in claim 1, wherein the second allocation unit allocates the second Reduce processing to an information processing apparatus designated by a user among the plurality of information processing apparatuses.

6. A control method, comprising:
  identifying, by using one of a plurality of information processing apparatuses connected with a network, for each subnetwork of a plurality of subnetworks included in the network, one information processing apparatus from among information processing apparatuses included in the subnetwork;
  assigning, by using the one of the plurality of information processing apparatuses, for each subnetwork of the plurality of subnetworks, to the identified one information processing apparatus, a first Reduce processing that is a processing to summarize results of a Map processing executed for data held in the information processing apparatuses included in the subnetwork; and
  allocating, by using the one of the plurality of information processing apparatuses, for each subnetwork of the plurality of subnetworks, to any one of the plurality of information processing apparatuses, a second Reduce processing that is a processing to summarize results of the first Reduce processing executed for each subnetwork of the plurality of subnetworks.

7. A computer-readable, non-transitory storage medium storing a program for causing one of a plurality of information processing apparatuses connected with a network to execute a process, the process comprising:
  identifying, for each subnetwork of a plurality of subnetworks included in the network, one information processing apparatus from among information processing apparatuses included in the subnetwork;
  assigning, for each subnetwork of the plurality of subnetworks, to the identified one information processing apparatus, a first Reduce processing that is a processing to summarize results of a Map processing executed for data held in the information processing apparatuses included in the subnetwork; and
  allocating to any one of the plurality of information processing apparatuses, a second Reduce processing that is a processing to summarize results of the first Reduce processing executed for each subnetwork of the plurality of subnetworks.

* * * * *